United States Patent [19]
Kondoh

[11] Patent Number: 5,623,351
[45] Date of Patent: Apr. 22, 1997

[54] ANTIFERROELECTRIC LIQUID CRYSTAL PANEL CAPABLE OF DISPLAYING IMAGES WITHOUT FLICKERING

[75] Inventor: Shinya Kondoh, Tokorozawa, Japan

[73] Assignee: Citizen Watch Co., Ltd., Tokyo, Japan

[21] Appl. No.: 477,593

[22] Filed: Jun. 7, 1995

[51] Int. Cl.⁶ .................................................. G02F 1/1335
[52] U.S. Cl. .................................................. 349/100
[58] Field of Search ............................. 359/63, 103, 100

[56] References Cited

FOREIGN PATENT DOCUMENTS 2-153322  6/1990  Japan.
2-173724  7/1990  Japan.

OTHER PUBLICATIONS

Kondo, "Antiferroelectric Liquid Crystal Panel" Aug. 1994 Abstract.
Yamamoto, "Liquid Crystal Display Element" May 1994 Abstract.
Ueno, "Antiferroelectric Liquid Crystal Display" Dec. 1992 Abstract.

*Primary Examiner*—William L. Sikes
*Assistant Examiner*—James A. Dudek
*Attorney, Agent, or Firm*—Finnegan, Henderson, Farabow, Garrett and Dunner, L.L.P.

[57] ABSTRACT

A panel employing an antiferroelectric liquid crystal material displays images without flickering. Polarizer plates of the panel are arranged such that the polarization axis of one of them is in parallel with a line that halves an angle formed by the two positions of the major axis of a liquid crystal molecule, each position being defined by one of the and second stable states of the light transmittance of the liquid crystal material. The first stable state occurs under a voltage of one polarity, and the second stable state occurs under a voltage of opposite polarity. As a result, the light transmittance of the panel is identical between the first and second stable states, to thereby display white without flickering.

1 Claim, 3 Drawing Sheets

ANTIFERROELECTRIC LIQUID CRYSTAL PANEL CAPABLE OF DISPLAYING IMAGES WITHOUT FLICKERING

BACKGROUND OF THE INVENTION

1. Field of the Invention

The present invention relates to a display panel employing a matrix of pixels made of antiferroelectric liquid crystal material.

2. Description of the Related Art

Japanese Unexamined Patent Publication No. 2-173724 of Nippon Denso and Showa Shell Petroleum discloses a liquid crystal panel employing an antiferroelectric liquid crystal material. This panel realizes a wide view angle, a high-speed response, and a good multiplex property, and therefore, has been energetically studied.

FIG. 2 shows a display panel employing an antiferroelectric liquid crystal material according to a prior art. Polarizer plates 21a and 21b are arranged in a cross-Nicol relationship. An arrow 23a shows a polarization axis of polarizer plate 21a and an arrow 23b shows a polarization axis of polarizer plate 21b. A liquid crystal cell 22 is placed between the polarizer plates 21a and 21b so that the polarization axis of one of the polarizer plates 21a and 21b as shown by the arrow 23a or 23b is oriented in parallel with the major axis of an average molecule of the liquid crystal material when no electric field is applied. The cell 22 is black when no voltage is applied and is white when a voltage is applied. FIG. 3 shows a hysteresis curve indicating changes in the light transmittance of the cell 22 and voltages applied thereto. When the product of the width and height of a pulse applied to the cell 22 is above the threshold of the liquid crystal material, the liquid crystal material is put in a first stable state (a ferroelectric state) where the light transmittance of the liquid crystal material is saturated. When the polarity of a pulse whose product of the width and height is above the threshold of the liquid crystal material is inverted, the liquid crystal material is put in a second stable state (a ferroelectric state) where the light transmittance of the liquid crystal material is saturated. When the absolute value of the product of the width and height of the pulse applied to the liquid crystal material is below a threshold, the liquid crystal material is put in a third stable state (an antiferroelectric state).

The major axis of a liquid crystal molecule is oriented differently among the first to third stable states, and generally, an angle formed by this major axis between the first and third stable states is not equal to an angle formed by the same between the second and third stable states. Accordingly, when the polarization axis of one of the polarizer plates is in parallel with the major axis of an average liquid crystal molecule with no voltage like the prior art, the angle of this polarization axis from the major axis of a liquid crystal molecule changes between the first and second stable states. Consequently, the light transmittance of the liquid crystal panel fluctuates between the first and second stable states which displays different white colors and causes flickering.

SUMMARY OF THE INVENTION

An object of the present invention is to provide a liquid crystal panel capable of displaying images without flickering with any kind of antiferroelectric liquid crystal material.

In order to accomplish the object, the present invention provides a liquid crystal panel having an antiferroelectric liquid crystal material and two polarizer plates holding the liquid crystal material between them. The polarizer plates are arranged such that the polarization axes thereof are orthogonal to each other and such that one of the polarization axes is in parallel with a line that halves an angle formed by the major axis of a liquid crystal molecule between two saturated states of the light transmittance of the liquid crystal material, one of the saturated states occurring under a voltage of one polarity and the other occurring under a voltage of an opposite polarity. As a result, the angle of the polarization axis of the parallel polarizer plate from the major axis of a liquid crystal molecule is unchanged between the two saturated states (first and second stable states), even if an angle formed by this major axis between the first stable state and a third stable state, which occurs under no voltage, is not equal to an angle formed by the same between the second and third stable states.

When displaying white, the panel employing the antiferroelectric liquid crystal material must use both the first and second stable states to cancel the direct-current components of applied voltages. If the first and second stable states fluctuate the light transmittance of the liquid crystal material, the panel will flicker.

When the polarization axis of one of the polarizer plates is in parallel with a line that halves an angle formed by the two positions of the major axis of a liquid crystal molecule, each defined by one of the first and second stable states, the angle of this polarization axis from the major axis of a liquid crystal molecule is unchanged between the first and second stable states. As a result, the light transmittance of the liquid crystal material is identical between the first and second stable states, so that no flickering is caused.

DESCRIPTION OF THE PREFERRED EMBODIMENTS

Figure 1:
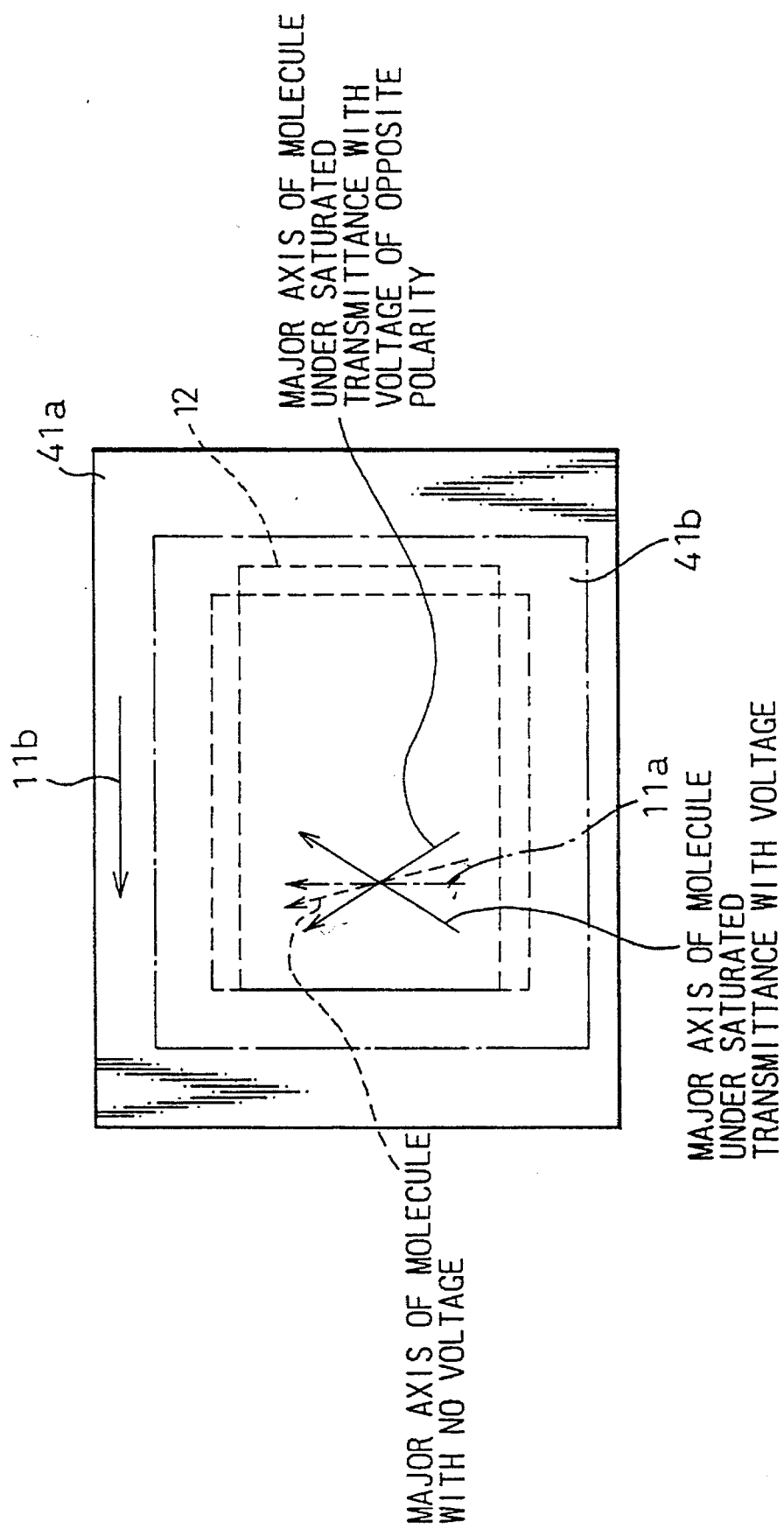
FIG. 1 shows an antiferroelectric liquid crystal cell and polarizer plates according to the present invention.
Figure 2:
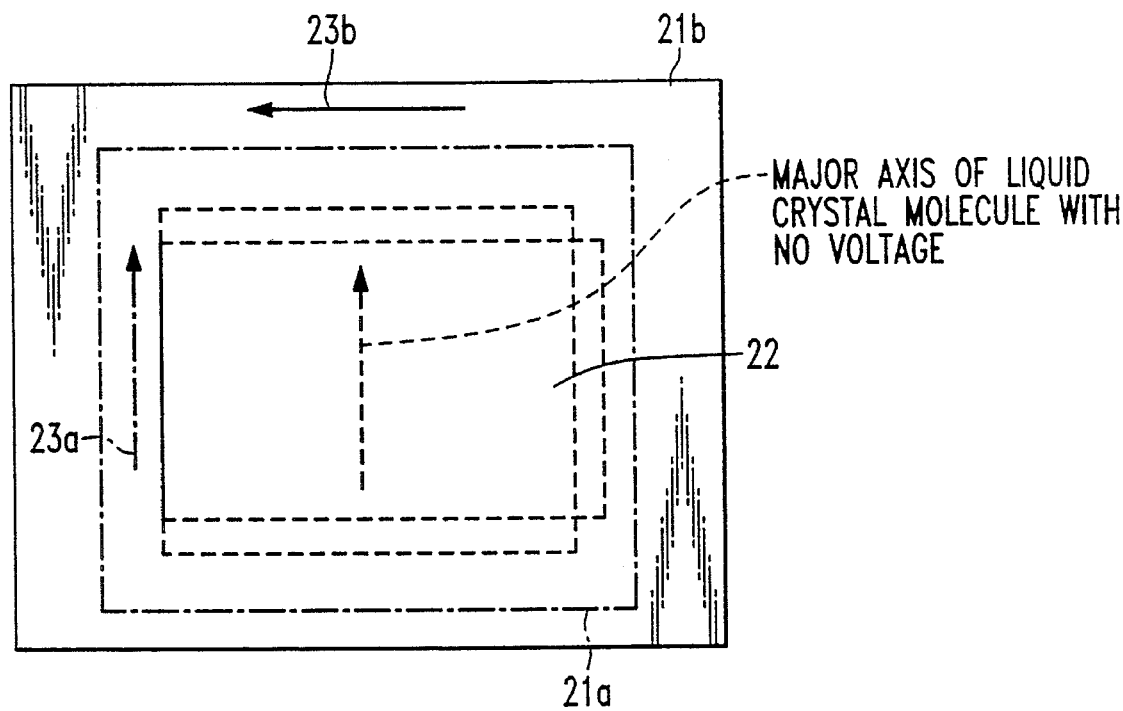
FIG. 2 shows an antiferroelectric liquid crystal cell and polarizer plates according to a prior art.
Figure 3:
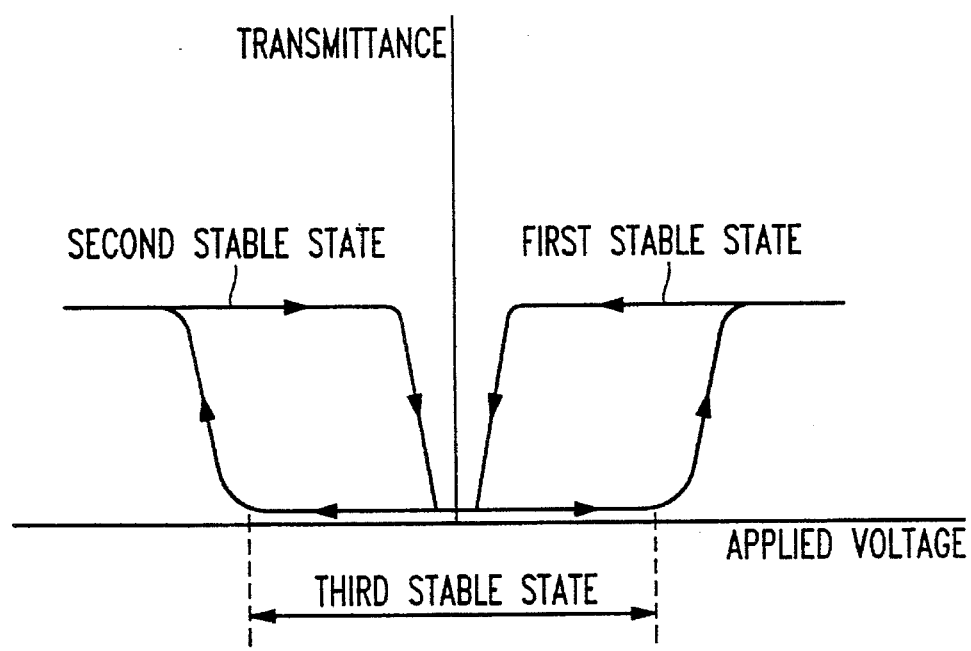
FIG. 3 is a hysteresis curve showing the characteristics of an antiferroelectric liquid crystal material.
Figure 4:
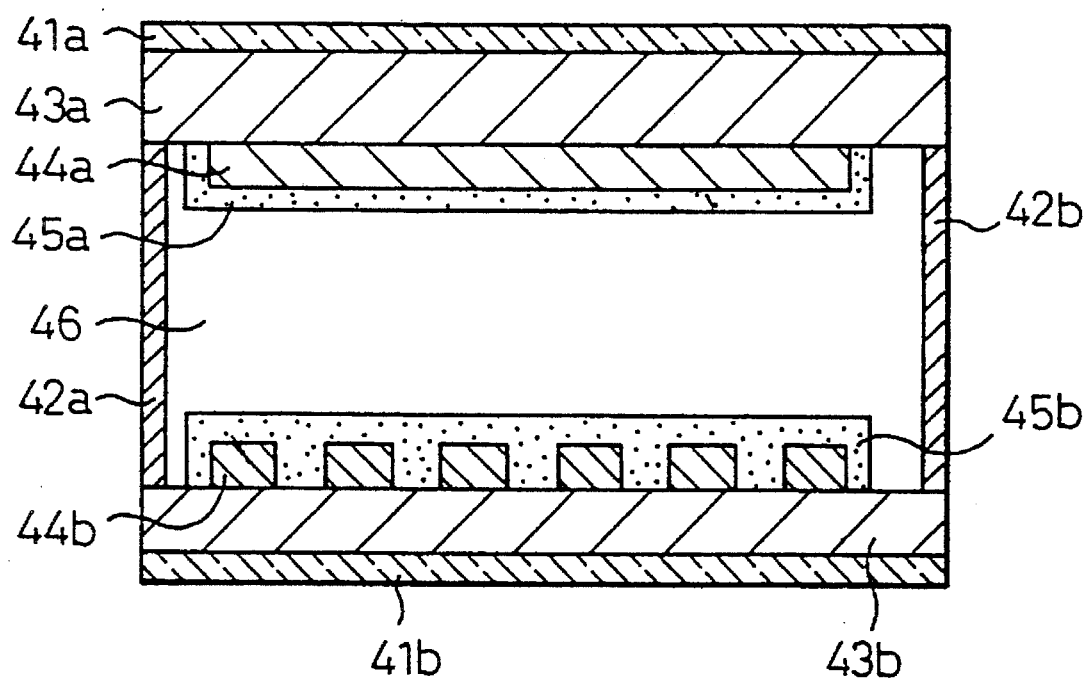
FIG. 4 shows a cell of an antiferroelectric liquid crystal panel.

An embodiment of the present invention will be explained with reference to the drawings. FIGS. 1 and 4 show a cell of an antiferroelectric liquid crystal panel according to the embodiment. Glass substrates 43a and 43b hold an antiferroelectric liquid crystal layer 46 about 2 μm thick. Faces of the glass substrates 43a and 43b that face each other have electrodes 44a and 44b, respectively. The electrodes 44a and 44b are coated with polymer alignment films 45a and 45b, respectively. The alignment films 45a and 45b are processed by rubbing. A first polarizer plate 41a is arranged on the glass substrate 43a, and a second polarizer plate 41b is arranged on the glass substrate 43b. The polarization axes 11a, 11b of the first and second polarizer plates 41a and 41b are orthogonal to each other. The polarization axis 11a of the first polarizer plate 41a is in parallel with a line that halves an angle formed by the two positions of the major axis of a liquid crystal molecule each position being defined by one of the first and second saturated or stable states of the light transmittance of the liquid crystal material in FIG. 1. The first stable state occurs when the light transmittance of the liquid crystal material is saturated by an applied voltage of one polarity. The second stable state occurs when the light transmittance of the liquid crystal material is saturated by an applied voltage of opposite polarity. The polarization axis 11a of the first polarizer plate 41a is usually inclined from the major axis of a liquid crystal molecule when no voltage is applied. In one test, this inclination was four degrees. Even with this inclination, the light transmittance of the liquid crystal material was 36.6% in both the first and second stable states. Accordingly, the panel of this embodiment displays images without flickering when driven by a time-sharing method.

A comparison of a cell having the same structure as the cell of FIG. 4 will now be explained. A first polarizer plate 41a is arranged on a glass substrate, and a second polarizer plate 41b is arranged on another glass substrate such that the polarization axes of the polarizer plates 41a and 41b are orthogonal to each other and such that one of the polarization axes is in parallel with the major axis of an average liquid crystal molecule when no voltage is applied. The light transmittance of this comparison was 37.8% in the first stable state and 35.8% in the second stable state. Due to this difference in the light transmittance, the comparison cell flickered when displaying white.

Table 1 shows the results of the tests made on the embodiment of the present invention and the comparison cell.

TABLE 1

|  | Light transmittance in 1st stable state | Light transmittance in 2nd stable state |
|---|---|---|
| Embodiment | 36.6% | 36.6% |
| Comparison | 37.8% | 35.8% |

As explained above, the present invention provides a display panel employing an antiferroelectric liquid crystal material, capable of displaying images without flickering when driven by a time-sharing method.

I claim:

1. A liquid crystal panel, comprising:

a pair of substrates positioned to have faces opposing each other;

antiferroelectric liquid crystal material held between the substrates;

electrodes formed at each of the opposing faces of the substrate; and two polarizer plates embracing faces of the substrates opposite the opposing faces and holding the pair of substrates between said plates, the two polarizer plates each having a polarization axis orthogonal to one another, one of the polarization axes being parallel with a line that halves an angle formed by two positions of a major axis of a liquid crystal molecule, each position being defined by one of two saturated states of light transmittance of the liquid crystal material, one of said saturated states occurring under a voltage of one polarity, the other of said saturated states occurring under a voltage of opposite polarity.

* * * * *